(12) United States Patent
Navarro Fajardo et al.

(10) Patent No.: US 11,257,238 B2
(45) Date of Patent: Feb. 22, 2022

(54) UNSUPERVISED OBJECT SIZING METHOD FOR SINGLE CAMERA VIEWING

(71) Applicant: Sigma Technologies, S.L., Madrid (ES)

(72) Inventors: Fulgencio Navarro Fajardo, Madrid (ES); Erik Velasco Salido, Madrid (ES)

(73) Assignee: Sigma Technologies, S.L., Madrid (ES)

( * ) Notice: Subject to any disclaimer, the term of this patent is extended or adjusted under 35 U.S.C. 154(b) by 109 days.

(21) Appl. No.: 16/612,999

(22) PCT Filed: Sep. 27, 2019

(86) PCT No.: PCT/ES2019/070647
§ 371 (c)(1),
(2) Date: Nov. 12, 2019

(87) PCT Pub. No.: WO2021/058841
PCT Pub. Date: Apr. 1, 2021

(65) Prior Publication Data
US 2021/0334996 A1    Oct. 28, 2021

(51) Int. Cl.
*G06T 7/70* (2017.01)
*G06T 7/62* (2017.01)
(Continued)

(52) U.S. Cl.
CPC .......... *G06T 7/62* (2017.01); *G06K 9/00664* (2013.01); *G06N 3/088* (2013.01); *G06T 7/194* (2017.01);
(Continued)

(58) Field of Classification Search
CPC .............. G06T 7/80; G06T 7/70; G01B 11/02
See application file for complete search history.

(56) References Cited

U.S. PATENT DOCUMENTS

| | | | |
|---|---|---|---|
| 6,658,399 B1* | 12/2003 | Acharya | ................. G06K 9/38 706/14 |
| 2009/0102841 A1* | 4/2009 | Clavadetscher | ..... H04N 13/275 345/420 |

(Continued)

FOREIGN PATENT DOCUMENTS

| | | | | |
|---|---|---|---|---|
| CN | WO2016/184152 | * | 11/2016 | ............. G01B 11/02 |
| JP | 2007327882 A | | 12/2007 | |
| WO | WO-2016184152 A1 | | 11/2016 | |

OTHER PUBLICATIONS

International Search Report issued in PCT/ES2019/070647 dated Jan. 24, 2020.

*Primary Examiner* — Myron Wyche
(74) *Attorney, Agent, or Firm* — Harness, Dickey & Pierce, P.L.C.

(57) ABSTRACT

An unsupervised method is presented for determining size of an object captured in an image. The method includes: capturing a set of images with a camera, where each image in the set of images is captured with the camera set at a different f-number; for each image in the set of images, computing a quality metric for the image, where the qualitymetric quantifies focus using contrast; identifying a given image in the set of images using the contrast metrics and the f-number of the camera; calculating a hyperfocal distance using parameters of the camera when taking the given image; and quantifying one or more dimensions of the object as a function of the hyperfocal distance; and if the object is known, using a view classifier to estimate the dimension in 3D.

18 Claims, 5 Drawing Sheets

(51) Int. Cl.
*G06T 7/80* (2017.01)
*G06K 9/00* (2022.01)
*G06N 3/08* (2006.01)
*G06T 7/194* (2017.01)

(52) U.S. Cl.
CPC .................. *G06T 7/70* (2017.01); *G06T 7/80* (2017.01); *G06T 2207/20081* (2013.01); *G06T 2207/20084* (2013.01)

(56) References Cited

U.S. PATENT DOCUMENTS

| | | | |
|---|---|---|---|
| 2014/0307056 A1* | 10/2014 | Collet Romea | G06T 7/136 348/47 |
| 2016/0225150 A1 | 8/2016 | Wilson et al. | |
| 2018/0130219 A1* | 5/2018 | Gu | G06T 7/593 |

* cited by examiner

Middle-Frontal View

FIG. 5A

3D Model

FIG. 5B

Middle-Lateral View

FIG. 5C

3D Model

FIG. 5D

UNSUPERVISED OBJECT SIZING METHOD FOR SINGLE CAMERA VIEWING

This application claims the priority of International Application Serial No. PCT/ES2019/070647, filed on Sep. 27, 2019. The entire disclosure of which is incorporated by reference herein.

FIELD

This disclosure relates to an unsupervised object sizing method for single camera viewing without using a reference object.

BACKGROUND

Unsupervised object size estimation using single camera view and no reference object is a very complex and uncommon task for computer vision systems. Despite the complexity of the problem, the information provided by the object sizing is useful in a variety of domains, such as video surveillance systems, medical images, and other kind of systems. Object profiling, object identification or object state recognition are examples of higher-level tasks that may rely on the object size information. There is a number of problems arising from the decision of using a single camera-based approach. However, it also presents a number of advantages.

In real world solutions, it is not always possible to have reference objects with known size.

Supervised methods require continuous interaction between the user and the system. In contrast, the advantage of an unsupervised method is to provide output without user intervention. Thus, there is a need for systems that provide an accurate and non-reference-based object sizing information without the use of a reference object.

Common state of the art solutions size objects by means of some external sensors or the interaction of multiple cameras. Current solutions that provide object size measurement are sometimes inaccurate or require a guide object with a known size to be precise.

Additionally, object size measurement is a complex task, and there are some issues that generally appear, for instance, the irregular shape of some objects, the occlusion that can suffer when the objects of interest are in realistic environments, lack of knowledge of the object's scale or the distance of the camera sensor to the object.

One approach is described in US Patent Publication No. 2007/0098251 which is a case of a single camera, no extra sensor and no reference algorithm. In this method, movement of the camera is essential to obtain the object distance which is a drawback because there are many scenarios where movement of the camera is not possible.

Another approach based on a single camera without external sensor and no reference object is described in U.S. Patent Publication No. 2012/0274762. This method introduces a focus swept so as to keep away from the required movement of the camera to acquire two pictures to compute the size, but selecting two points of the image by the user is needed to measure the distance. Supervised sizing systems are generally at a disadvantage as compared to unsupervised systems.

U.S. Patent Publication No. 2018/0336733 introduces an approximation that perform object detection combined with view detection and 3D reconstruction, however this proposal uses two cameras.

This section provides background information related to the present disclosure which is not necessarily prior art.

SUMMARY

This section provides a general summary of the disclosure, and is not a comprehensive disclosure of its full scope or all of its features.

An unsupervised method is presented for determining the size of an object captured in an image. The method includes: capturing a set of images with a camera, where each image in the set of images is captured with the camera set at a different f-number; identifying a given image in the set of images; calculating a hyperfocal distance using parameters of the camera when taking the given image; and quantifying one or more dimensions of the object as a function of the hyperfocal distance.

The method further includes: capturing a triggering image of a scene and identifying presence of an object in the triggering image. The presence of an object in the image may be identified using a background subtraction method.

In one embodiment, for each image in the set of images, a quality metric for the image is computed, where the quality metric quantifies the focus of an image based on the contrast.

The given image in the set of images can be identified by identifying a subset of images from the set of images, where each image in the subset of images has a contrast metric with a value greater than a threshold, and selecting the given image from the subset of images, where the given image has the lowest f-number amongst the images in the subset of images.

In some embodiments, the one or more dimensions of the object may be quantified using the triangle similarity theorem and the contrast metric is further defined as fuzzy entropy.

In other embodiments, the method further includes: identifying the object in the triggering image using a neural network; extracting a region of interest from each image in the set of images, where the region of interest contains the identified object; and for each image in the set of images, computing the contrast metric for the image using only the region of interest extracted from the image.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
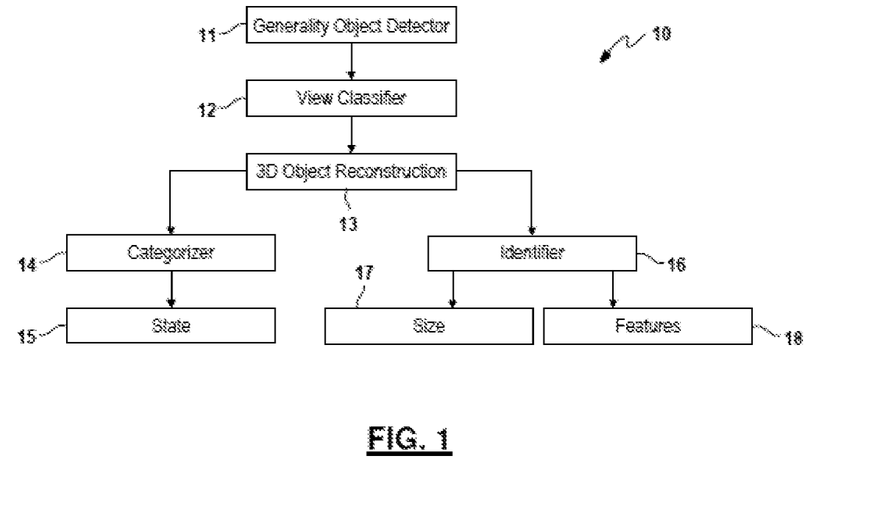
FIG. 1 is a flowchart showing a general computer vision system.

FIG. 1 depicts a general computer vision system 10 which employs a standard architecture for designing computer vision applications. The main goal of the system is to provide a complete object characterization. Also, the defined architecture facilitates the integration of the multiple algorithms required to perform object profiling in the same architecture.

Generality object detector 11, from now on "generality detector, view classifier 12 and 3D reconstruction 13 are common to all the tasks and are described in detail later in the document. Depending on the application, the design follows the Categorizer branch 14 or the Identifier branch 16. The final step in the Categorizer branch is determining the object state, for example if the object is broken or not, as well as if it has missing parts or not. The methods set forth in this disclosure lie in the Identifier branch. The Identifier branch has itself two possible subbranches: sizing related applications 17 and features description applications 18. More specifically, this disclosure pertains to object sizing 17; whereas, the features branch 18 returns object attributes like the color, the material, etc.

Figure 2:
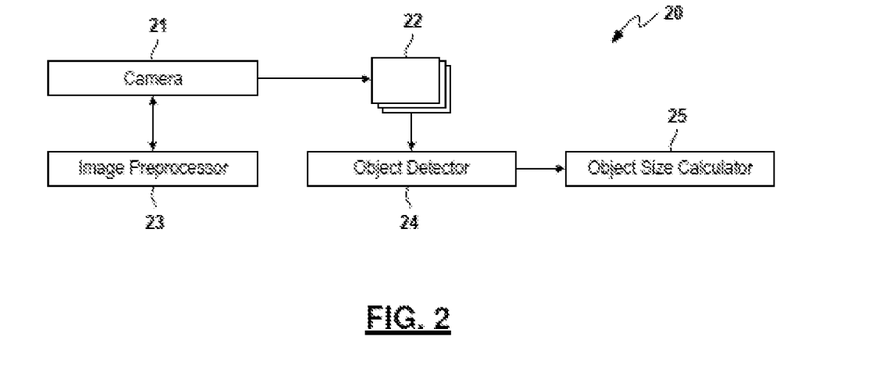
FIG. 2 is a block diagram depicting a system for object sizing.

FIG. 2 depicts a system 20 for determining the size of an object captured in an image. The system 20 is comprised generally of: a camera 21, an image preprocessor 23, an object detector 24 and an object size calculator 25. The image preprocessor 23 is interfaced with the camera 21 and interacts with the camera 21 to capture a set of images 22, where each image in the set of images 22 is captured with the camera set at a different f-number. The object detector 24 is configured to receive the set of images 22. For each image in the set of images, the object detector 24 processes a given image with the highest quality metric, i.e. the highest contrast/f-number ratio, amongst the images in the set of images. The object size calculator 25 in turn receives the given image from the object detector 24. The object size calculator 25 uses the hyperfocal distance, calculated using parameters of the camera, and quantifies one or more dimensions of the object as a function of the hyperfocal distance.

Figure 3:
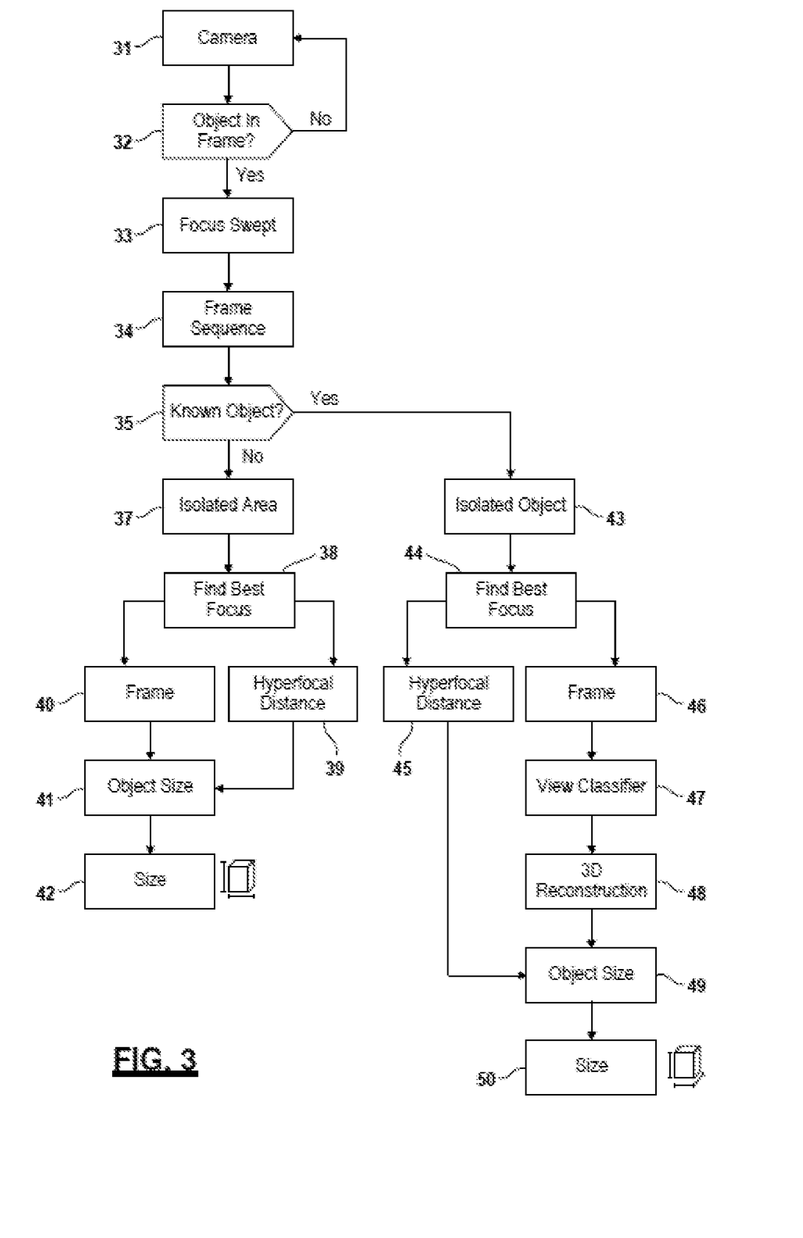
FIG. 3 is a flow diagram for an example embodiment of an object sizing method.

FIG. 3 further illustrates an example embodiment for determining the size of an object captured in an image. At step 31, a camera with a convex lens captures a frame. A frame is defined as an image of the observed scene. In this embodiment, objects to be sized appears in the frame.

At step 32, the presence of objects in the frame is evaluated. A background subtraction algorithm can be used to detect foreground objects in the scene. In one embodiment, the selected algorithm is Background Subtraction using Local Singular Valued Decomposition Binary Pattern (BSLSVDBP) combined with objectness algorithm based on Binarized Normed Gradient as described by M. Cheng et al in "Binarized Normed Gradients for Objectness Estimation at 300 fps", 2014 IEEE Conference on Computer Vision and Pattern Recognition (2014). This BSLSVDBP algorithm is single-parameter dependent. The parameter is the learning rate. It is selected depending on the scenario. It is possible to use other background segmentation methods or region proposal methods to detect an object presence in the scene. This is a key step for the embodiment, as it addresses the unsupervision challenge.

If objects are detected in step 32, a focus swept is performed at step 33. The focus is defined as the camera aperture value to change the hyperfocal distance with a focal length and circle of confusion fixed values. The camera focus range is swept. For each focus value, a frame-focus value pair is saved. The number of saved frames is set as the maximum value between a minimum value (30) and the total discrete values in the camera focus range. The resulting frame set is forwarded at 34 to the next step.

Object identification is performed at step 35. The analysis is performed only in one of the frames contained in the set. The analysis output may be: known object together with its associated category, or unknown object. In one embodiment, object identification is carried out by a neural network algorithm developed particularly for this duty. For example, a ResNet-101 neural network pre-trained in Image-Net may be used as described by K. He et al in "Deep Residual Learning For Image Recognition", 2016 IEEE Conference on Computer Vision and Pattern Recognition (2016), which is incorporated in its entirety herein although other neural networks designed to carry out object recognition can be used in place. The model has been trained with a specific dataset composed of pre-defined (known) objects, where the objects are selected depending of the scenario where the system is implemented. For example, in an airport scenario, the selected objects are handbags, backpacks, trolleys, etc. The set of known objects may be changed by defining a new dataset to train.

Depending upon whether the object was identified, the method proceeds along one of two different paths. In the case the object is unknown, a region of interest (ROI) is extracted at 37 from each image in the frame set, where the region of interest contains the unknown object. For example, the region of interest is defined by the object bounding box and its mask, for example output in the step 32. Note that the same area is isolated in all the frames of the frame set. The resulting set of isolated areas is used as an input for step 38.

Next, the method identifies a given image from the set of isolated areas using a quality metric define as the ratio: focus metric/f-number, at step 38. In one embodiment, the set of isolated areas is scanned in search of the subset of images that surpass a particular focus metric threshold. The threshold is determined empirically. The quality is analyzed in terms of focus, specifically using a contrast metric. A contrast metric is computed for each image. In one embodiment, the contrast metric is computed with the fuzzy entropy at a pixel level on its neighbor window of size w×w pixels: By default, w=5. This value can be modified depending on the size of the regions of interest. The full region of interest contrast is computed as the sum of all pixel contrast measurements. From the regions of interest with a contrast value that exceeds the threshold, we will select the one with the lowest aperture value (i.e., f-number). This selected image, along with its associated focus value, is forwarded to the next steps.

A hyperfocal distance (H) is calculated at step 39 using parameters of the camera when taking the image. In one embodiment, the hyperfocal distance is computed with the following equation:

$$H = \frac{f^2}{Nc} + f$$

where f is the focal distance, N is the F-number (i.e., f/D where D is the diameter of the aperture) and c is the circle of confusion limit. f and c are parameters associated to the camera, and N is also received from the camera when the image was captured.

One or more dimensions of the object are quantified at 41 as a function of the hyperfocal distance. In the example, the proper object sizing (real object size—ROS) is computed using the triangle similarity theorem. For example, the object size is computed as follow:

$$ROS = \frac{H * SOS}{f}$$

where SOS is the object size in the sensor, H is the hyperfocal distance and f is the focal distance.

Lastly, the size of the object is presented at step 42, for example on a display of the system. For unknown objects, two dimensions are determined from the image: height of the object and width of the object.

In the case the object is known, the pixels that contain the object are isolated at step 43. The process is performed in the complete set of frames. In the example embodiment, the segmentation algorithm is based on a neural network that segment the object from the background, and the output is the area of pixels that contains the object. For example, the segmentation is performed using a U-Net method as described by O. Ronnenberger et al in "Convolutional Networks for Biomedical Image Segmentation", Medical Image Computing and Computer-Assisted Invention, 2015, Cham, 2015 which is incorporated in its entirety herein. The U-Net method is pre-trained with the ImageNet dataset and refined with the known object dataset. It is applied over that frame to obtain the segmentation, however others algorithms that perform segmentation can be applied. The U-Net returns masks with the segmentation of frames. The masks are applied over the frames and the object of interest is isolated in all the frames of the frame set.

Next, the method identifies a given image, from the set of isolated areas, having the lowest f-number of those images considered "in focus" based on the focus metric threshold, at step 42. This step is the same as described in relation to step 38. Likewise, a hyperfocal distance (H) is calculated at step 45 using the parameters of the camera in the same manner as described in relation to step 39.

Figure 4:
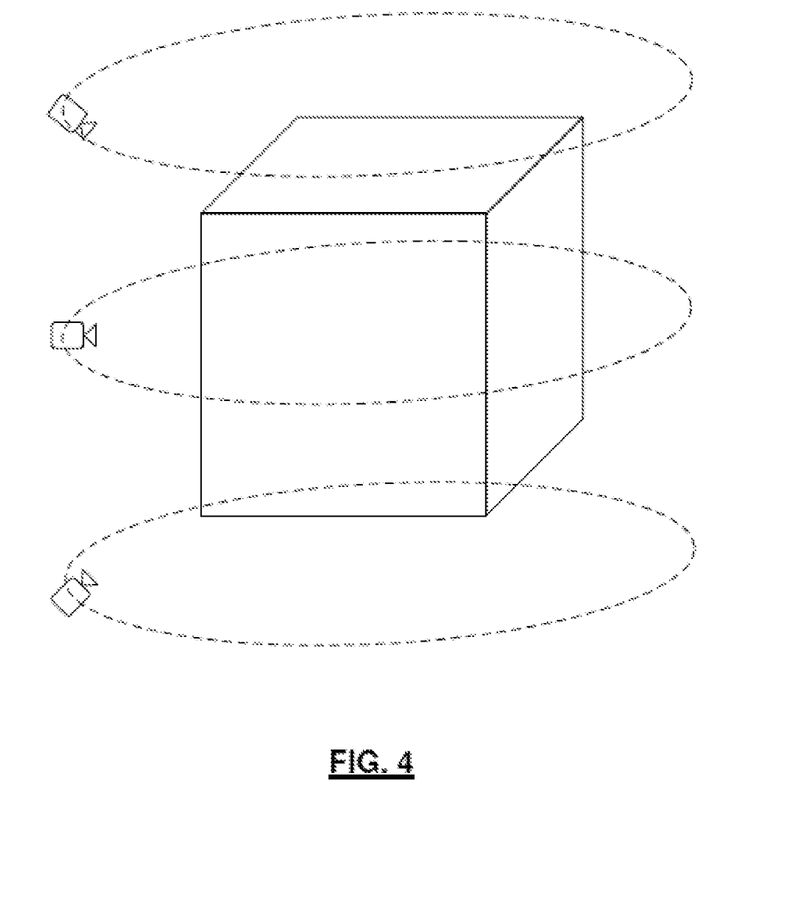
FIG. 4 is a diagram showing the camera disposition for a known object dataset.

In the example embodiment, view classification of the object is executed at step 47. A neural network designed specifically for this task performs the object view classification. This network presents a VGG16 architecture with similar parameters to those described by K. Simonyan et al in "Very Deep Convolutional Networks For Large-Scale Image Recognition" (2014), which is incorporated in its entirety herein although other algorithms designed for the same task or for object pose estimation can be used. The neural network was trained with a specific dataset composed of 108 views of each of the known objects. Although the number of views can vary, this number of views allows to sample the object every 10 degrees in the superior, central and inferior position (see FIG. 4) covering the object completely.

Figure 5A:
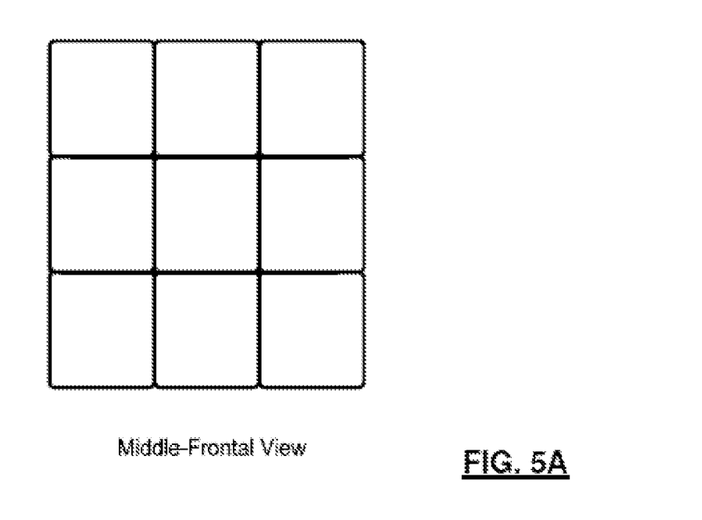
FIGS. 5A and 5B are a frontal view and a perspective view of Rubik's Cube, respectively.
Figure 5B:
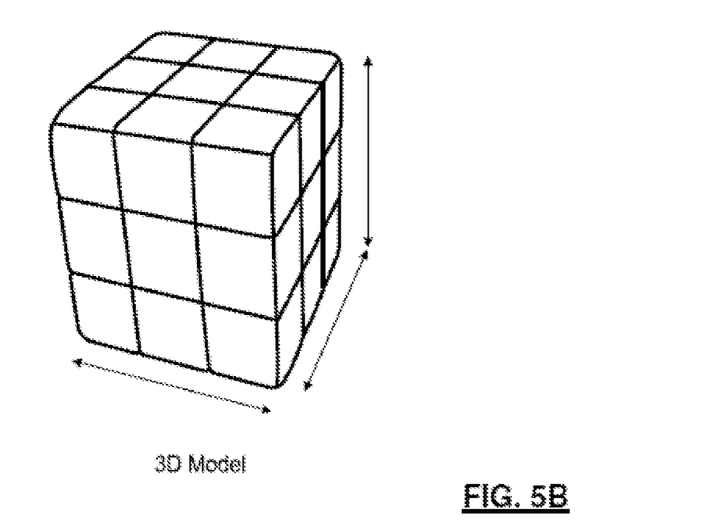
Figure 5C:
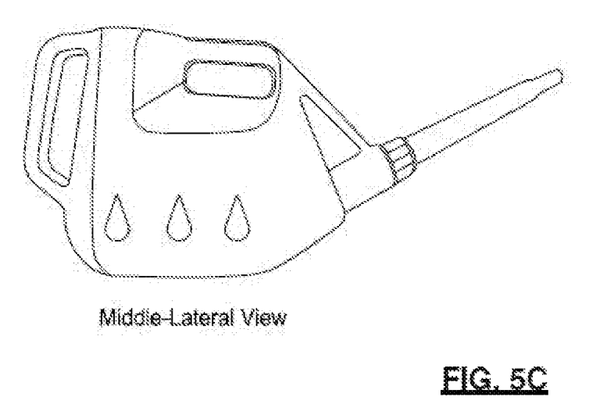
FIGS. 5C and 5D are a frontal view and a perspective view of watering can, respectively.
Figure 5D:
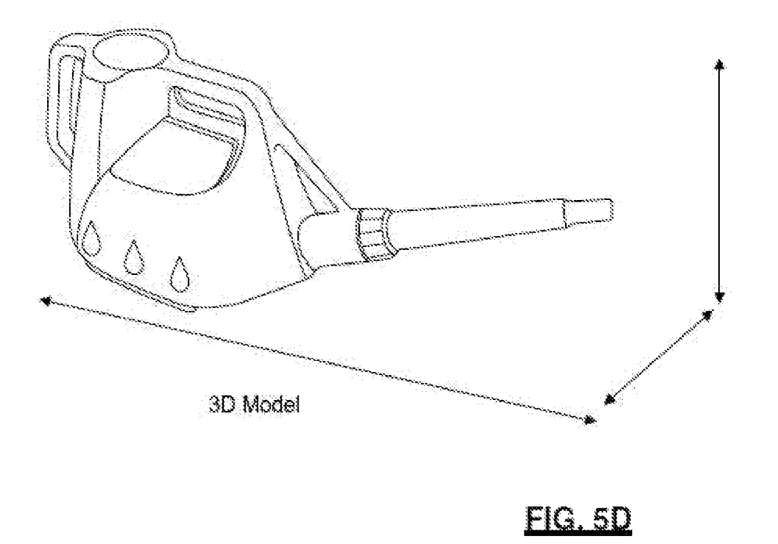

A three-dimensional reconstruction of the object is carried out in step 48. In one embodiment, a 3D reconstruction of the object is carried out by a neural network ResNet-34 refined to identify the 3D reconstruction (see FIG. 5) of the object and produce the spatial information based on the pose information obtained in the previous step. The neural network is trained with a dataset including 108 views for all the known objects and the 3D reconstruction models for each object. Once the 3D model is retrieved (meaning a 3D model of a known object has been identified), the 3D reconstruction is adjusted to the view of the object that has been isolated in the image selected by creating a correspondence of the points of the original object view contained in the dataset and the isolated object. For example, if the isolated area is classified as a middle-frontal view of a Rubik's Cube (see FIG. 5A), through this information the algorithm retrieves the respective 3D model of the Rubik's Cube, and adjust the dimensions to that of the object that has been isolated. In another example, the isolated area is classified as a middle-lateral view of a watering can (see FIGS. 5C and 5D), the associated 3D model of the watering can is identified, and the water can dimensions are computed by adjusting them to that of the isolated object.

One or more dimensions of the object are then quantified at 49. In one embodiment, the object sizing is calculated in a similar way as in step 41. If some part of the object is occluded, the dimensions are predicted with the model and the known dimensions of the visible parts. For example, if the identified object is a Rubik's Cube and the view is a middle-frontal view, the depth dimension is not visible as can been seen in FIG. 5A. In that case, the depth is inferred by the model and the known visible dimensions. In the case of the middle-lateral watering can view, the occluded dimension is the width, the algorithm infers it. In the case of a known object, three dimensions of the object are quantified: height, width and depth of the object.

The unsupervised method for determining the size of an object is suitable for different applications. For example, the method can be used to automate the hand-luggage size control in an airport, where a camera in an unsupervised manner can automatically determine the size of hand luggage. In this case, the disclosure would facilitate a reduction of time in the boarding process.

Another application is to automatically measure the size of trucks to authorize or not the access of large vehicles to restricted roads that large vehicles cannot use.

A third example of application is the measurement of postal, UPS or Fedex packages to calculate automatically shipping costs.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An unsupervised method for determining size of an object captured in an image, comprising:
   capturing, by a camera, a triggering image of a scene;
   identifying, by a computer processor, presence of an object in the triggering image;
   capturing, by the camera; a set of images, each image in the set of images is captured with the camera set at a different f-number and the set of images is captured in response to the identification of presence of the object in the image;
   identifying, by the computer processor, a given image in the set of images by identifying a subset of images from the set of images, where each image in the subset of images has a contrast metric with a value greater than a threshold, and selecting the given image from the subset of images, where the given image has lowest f-number amongst the images in the subset of images;
   calculating, by the computer processor, a hyperfocal distance using parameters of the camera when taking the given image; and
   quantifying, by the computer processor, one or more dimensions of the object as a function of the hyperfocal distance.

2. The method of claim 1 further comprises identifying presence of an object in the image using background subtraction method.

3. The method of claim 1 further comprises
   for each image in the set of images, computing, by the computer processor, a quality metric for the image, where the quality metric quantifies focus using contrast; and
   identifying, by the computer processor, a given image in the set of images using the relation between the quality metric and the f-number.

4. The method of claim 3 wherein computing a contrast metric further comprises computing fuzzy entropy.

5. The method of claim 1 further comprises quantifying one or more dimensions of the object using triangle similarity theorem.

6. The method of claim 1 further comprises quantifying one or more dimensions of the object with where ROS is size of the object, H is hyperfocal, SOS is size of object in camera sensor and f is focal distance.

7. The method of claim 1 further comprises
   identifying the object in the triggering image using a neural network;
   extracting a region of interest from each image in the set of images, where the region of interest contains the identified object; and
   for each image in the set of images, computing the contrast metric for the image using only the region of interest extracted from the image.

8. An unsupervised method for determining the dimensions of an object captured in an image, comprising:
   capturing, by a camera, a triggering image of a scene;
   identifying, by a computer processor, presence of an object in the triggering image;
   capturing, by the camera, a set of images, each image in the set of images is captured with the camera set at a different f-number and the set of images is captured in response to the identification of presence of the object in the image;
   selecting, by the computer processor, a given image from the set of images;
   calculating, by the computer processor, a hyperfocal distance using parameters of the camera when taking the given image;
   identifying, by the computer processor, the object in the triggering image;
   retrieving, by the computer processor, a three-dimensional model for the identified object, where the three-dimensional model includes dimensions for the identified object; and
   quantifying, by the computer processor, three dimensions of the identified object using the hyperfocal distance and the dimensions for the identified object retrieved from the three-dimensional model.

9. The method of claim 8 further comprises identifying presence of an object in the image using background subtraction method.

10. The method of claim 8 wherein selecting a given image from the set of images further comprises
for each image in the set of images, computing, by the computer processor, a quality metric for the image, where the quality metric quantifies focus using contrast;
identifying a subset of images from the set of images, where each image in the subset of images has a contrast metric with a value greater than a threshold; and
selecting the given image from the subset of images, where the given image has lowest f-number amongst the images in the subset of images.

11. The method of claim 10 wherein computing a contrast metric further comprises computing fuzzy entropy.

12. The method of claim 10 further comprises
extracting a region of interest from each image in the set of images, where the region of interest contains the identified object; and
for each image in the set of images, computing the contrast metric for the image using only the region of interest extracted from the image.

13. The method of claim 12 further comprises extracting a region of interest from each image in the set of images using a neural network.

14. The method of claim 8 wherein quantifying three dimensions of the identified object further comprises
determining a view of the object in the given image;
determining whether one or more of the three dimensions is occluded in the given image;
determining the one or more occluded dimensions using the three-dimensional model in response to the determining that one or more of the three dimensions is occluded in the given image;
quantifying, from the given image, the real object size using the triangle similarity theorem and the three-dimensional model determined; and
quantifying, from the given image, the real object size using with $$ROS = H * SOS / f$$

where ROS is real size of the object, H is hyperfocal, SOS is size of object in camera sensor and f is focal distance.

15. A system for determining the dimensions of an object captured in an image, comprising:
a camera configured to capture images of a scene;
an image preprocessor interfaced with the camera and cooperatively interacts with the camera to capture a set of images of the scene, where each image in the set of images is captured at a different f-number;
an object detector configured to receive the set of images and identify presence of an object in the image; and
an object size calculator interfaced with the object detector, wherein, for each image in the set of image, the object size calculator computes a quality metric for the image, identifies a given image in the set of images using the relation between the quality metric and the f-number, and quantifying one or more dimensions of the object as a function of the hyperfocal distance of the given image, where the quality metric quantifies focus using contrast;
wherein the object size calculator identified the given image in the set of images by identifying a subset of images from the set of images, where each image in the subset of images has a contrast metric with a value greater than a threshold, and selecting the given image from the subset of images, where the given image has lowest f-number amongst the images in the subset of images.

16. The system of claim 15 wherein the object detector identifies presence of an object in the image using background subtraction method.

17. The system of claim 15 wherein the contrast metric is further defined as fuzzy entropy.

18. The system of claim 15 wherein the object size calculator quantifies one or more dimensions of the object using triangle similarity theorem.

* * * * *